United States Patent
Guthrie et al.

[11] Patent Number: 5,898,888
[45] Date of Patent: Apr. 27, 1999

[54] METHOD AND SYSTEM FOR TRANSLATING PERIPHERAL COMPONENT INTERCONNECT (PCI) PEER-TO-PEER ACCESS ACROSS MULTIPLE PCI HOST BRIDGES WITHIN A COMPUTER SYSTEM

[75] Inventors: Guy Lynn Guthrie, Austin; Danny Marvin Neal, Round Rock; Steven Mark Thurber, Austin, all of Tex.

[73] Assignee: International Business Machines Corporation, Armonk, N.Y.

[21] Appl. No.: 08/766,737

[22] Filed: Dec. 13, 1996

[51] Int. Cl.⁶ ...................................................... G06F 13/40
[52] U.S. Cl. ............................ 395/308; 395/306; 395/287
[58] Field of Search ................................ 395/293, 292, 395/287, 306, 308; 364/238, 238.2, 238.3, 238.6

[56] References Cited

U.S. PATENT DOCUMENTS

| | | | |
|---|---|---|---|
| 5,381,532 | 1/1995 | Suzuki ...................................... | 395/584 |
| 5,396,602 | 3/1995 | Amini et al. .............................. | 395/293 |
| 5,448,704 | 9/1995 | Spaniol et al. ........................... | 395/310 |
| 5,455,915 | 10/1995 | Coke ........................................ | 395/293 |
| 5,522,050 | 5/1996 | Amini et al. .............................. | 395/306 |
| 5,528,764 | 6/1996 | Heil ......................................... | 395/293 |
| 5,533,204 | 7/1996 | Tipley ...................................... | 395/288 |
| 5,546,546 | 8/1996 | Bell et al. ................................ | 395/293 |
| 5,548,730 | 8/1996 | Young et al. ............................. | 395/280 |
| 5,550,989 | 8/1996 | Santos ..................................... | 395/306 |
| 5,555,383 | 9/1996 | Elazar et al. ............................. | 395/306 |
| 5,559,968 | 9/1996 | Stancil et al. ............................ | 395/306 |
| 5,564,026 | 10/1996 | Amini et al. ............................. | 395/308 |
| 5,625,824 | 4/1997 | Melo et al. ............................... | 395/728 |
| 5,640,570 | 6/1997 | St. Clair et al. ......................... | 395/733 |
| 5,673,399 | 9/1997 | Guthrie et al. ........................... | 395/308 |
| 5,751,950 | 5/1998 | Crisan .................................. | 395/188.01 |

*Primary Examiner*—Robert B. Harrell
*Assistant Examiner*—David M. Ovedovitz
*Attorney, Agent, or Firm*—Richard A. Henkler; Antony P. Ng; Andrew J. Dillon

[57] ABSTRACT

A method and system for translating peer-to-peer access across multiple Peripheral Component Interconnect (PCI) host bridges within a data-processing system are disclosed. In accordance with the method and system of the present invention, a processor and a system memory are connected to a system bus. A first and at least a second PCI local buses are also connected to the system bus via a first PCI host bridge and a second PCI host bridge, respectively. The two PCI local buses have bus transaction protocols that are different from those of the system bus. At least one PCI device is connected to each of the two PCI local buses, and shares data with the processor and the system memory. In addition, each PCI device shares data with the other PCI device as peer-to-peer devices across multiple PCI host bridges. A sequence of transactions is controlled through the two PCI host bridges to prevent a deadlock condition by not allowing a subsequent peer-to-peer write request destined for one of the two PCI local buses to be blocked from making progress through the two PCI host bridges.

16 Claims, 3 Drawing Sheets

METHOD AND SYSTEM FOR TRANSLATING PERIPHERAL COMPONENT INTERCONNECT (PCI) PEER-TO-PEER ACCESS ACROSS MULTIPLE PCI HOST BRIDGES WITHIN A COMPUTER SYSTEM

CROSS-REFERENCE TO RELATED APPLICATIONS

The present invention is related to the subject matter of the following co-pending applications:

U.S. patent application entitled "Data Processing System including Buffering Mechanism for Inbound and Outbound Reads and Posted Writes," filed Jun. 7, 1995, U.S. Pat. No. 5,694,556, and assigned to the assignee herein named;

U.S. patent application entitled "System and Method for Enhancement of System Bus to Mezzanine Bus Transactions," filed Jan. 5, 1996, U.S. Pat. No. 5,777,622, and assigned to the assignee herein named;

U.S. patent application entitled "Method and System for Supporting Peripheral Component Interconnect (PCI) Peer-to-Peer Access Across Separate PCI Host Bridges within a Data Processing System," filed Dec. 13, 1996, U.S. Pat. No. 5,761,462, and assigned to the assignee herein named.

The contents of both above-mentioned co-pending applications are incorporated by reference herein.

BACKGROUND OF THE INVENTION

1. Technical Field

The present invention relates to a method and system for data processing in general and, in particular, to a method and system for handling Peripheral Component Interconnect (PCI) peer-to-peer accesses within a computer system. Still more particularly, the present invention relates to a method and system for translating PCI peer-to-peer access across multiple PCI host bridges within a computer system.

2. Description of the Prior Art

A computer system typically includes several types of buses, such as system bus, local buses, and peripheral buses. Various electronic circuit devices and components are connected with each other via these buses such that intercommunication may be possible among all of these devices and components.

In general, a central processing unit (CPU) is attached to a system bus, over which the CPU communicates directly with a system memory that is also attached to the system bus. A local bus is intended for connecting certain highly integrated peripheral components on the same bus as the CPU. One such local bus is known as the Peripheral Component Interconnect (PCI) bus. Under the PCI local bus standard, peripheral components can directly connect to a PCI local bus without the need for glue logic. Thus, PCI provides a bus standard on which high-performance peripheral devices, such as graphics devices and hard disk drives, can be coupled to the CPU, thereby permitting these high-performance peripheral devices to avoid the general access latency and the bandwidth constraints that are associated with a peripheral bus. A peripheral bus such as an Industry Standard Architecture (ISA) bus, is for connecting various peripheral devices to the computer system. These peripheral devices typically include input/output (I/O) devices such as a keyboard, floppy drives, and printers.

Generally, each system bus, local bus, and peripheral bus utilizes an independent set of protocols (or rules) to conduct data transfers between various devices attached to it. Each of these protocols is designed into a bus directly and is commonly referred to as the "architecture" of the bus. In a data transfer between different bus architectures, data being transferred from the first bus architecture may not be in a form that is usable or intelligible by the receiving second bus architecture. Accordingly, a mechanism is developed for "translating" data that are required to be transferred from one bus architecture to another. This translation mechanism is normally contained in a hardware device in the form of a bus-to-bus bridge (or interface) through which the two different types of buses are connected.

Incidentally, various bus-to-bus bridges have been designed to match the communication protocol of one bus with that of another in order to permit system-wide communications between devices on different buses. For example, a bus-to-bus bridge connecting between a system bus and a PCI local bus is called a PCI host bridge. The PCI host bridge contains all the logic and hardware for translating data communications between the system bus and the PCI local bus, and ensures that data is transferred between these two buses intelligibly.

In a PCI-based system where there are multiple PCI host bridges, there needs to be a way, however, for a PCI host bridge to differentiate as to whether a PCI device, during a direct memory access (DMA) request, is trying to access the system memory or another PCI device. Further, if the requesting PCI device is trying to access another PCI device, i.e., a peer-to-peer access, the PCI host bridge also needs to determine whether the other PCI device is under the same PCI host bridge as the requesting PCI device or under a different PCI host bridge.

A peer-to-peer access typically has some different characteristics than a DMA access to the system memory. Some of these differences can be attributed to the fact that an access to a PCI memory may have side effects depending on how the access is performed, such as the order of the access, the width of the access, etc. For example, prefetching more data on a read operation than what a requesting PCI device is requesting can cause a problem. This is because a read access to addresses on a PCI device may cause side effects, and accessing data outside of what is requested may also have undesirable side effects. In addition, a PCI local bus may allow some unusual operations that are typically not supported by the system interconnect to which the PCI host bridge is attached. As an example, the PCI local bus allows discontiguous bytes to be accessed within a single 4-byte or 8-byte access. If this discontiguous access were to be allowed for peer-to-peer transactions, and if the system interconnect does not support such discontiguous transaction without breaking up the transaction (which is a high probability), and if this discontiguous transaction causes different side effects to the transaction when broken up, then the peer to-peer transaction would probably not function properly when such is attempted to perform across multiple PCI host bridges. Thus, in order to support peer-to-peer transactions across multiple PCI host bridges, additional requirements are necessary. Some of these requirements affect the way a PCI host bridge operates, and some put certain restrictions on the transactions that are allowed by a peer-to-peer access. The additional rules and requirements for supporting PCI peer-to-peer access across multiple PCI host bridges are the subject matter of the present disclosure.

SUMMARY OF THE INVENTION

In view of the foregoing, it is therefore an object of the present invention to provide an improved method and system for data processing.

It is another object of the present invention to provide an improved method and system for handling PCI peer-to-peer accesses within a data-processing system.

It is yet another object of the present invention to provide an improved method and system for translating PCI peer-to-peer access across multiple PCI host bridges within a data-processing system.

In accordance with the method and system of the present invention, a processor and a system memory are connected to a system bus. A first and at least a second PCI local buses are also connected to the system bus via a first PCI host bridge and a second PCI host bridge, respectively. The two PCI local buses have bus transaction protocols that are different from those of the system bus. At least one PCI device is connected to each of the two PCI local buses, and shares data with the processor and the system memory. In addition, each PCI device shares data with another PCI device as peer-to-peer devices across the two PCI host bridges. A sequence of transactions is controlled through each of the PCI host bridges to prevent a deadlock condition by not allowing a subsequent peer-to-peer write request destined for a PCI local bus from being accepted or to be blocked from making progress through either one of the two PCI host bridges.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable in a variety of computers under a number of different operating systems. The computer may be, for example, a personal computer, a mini-computer, or a mainframe computer. For the purpose of illustration, a preferred embodiment of the present invention, as described below, is implemented on a mini-computer, such as the RS/6000™ series manufactured by International Business Machines Corporation.

Figure 1:
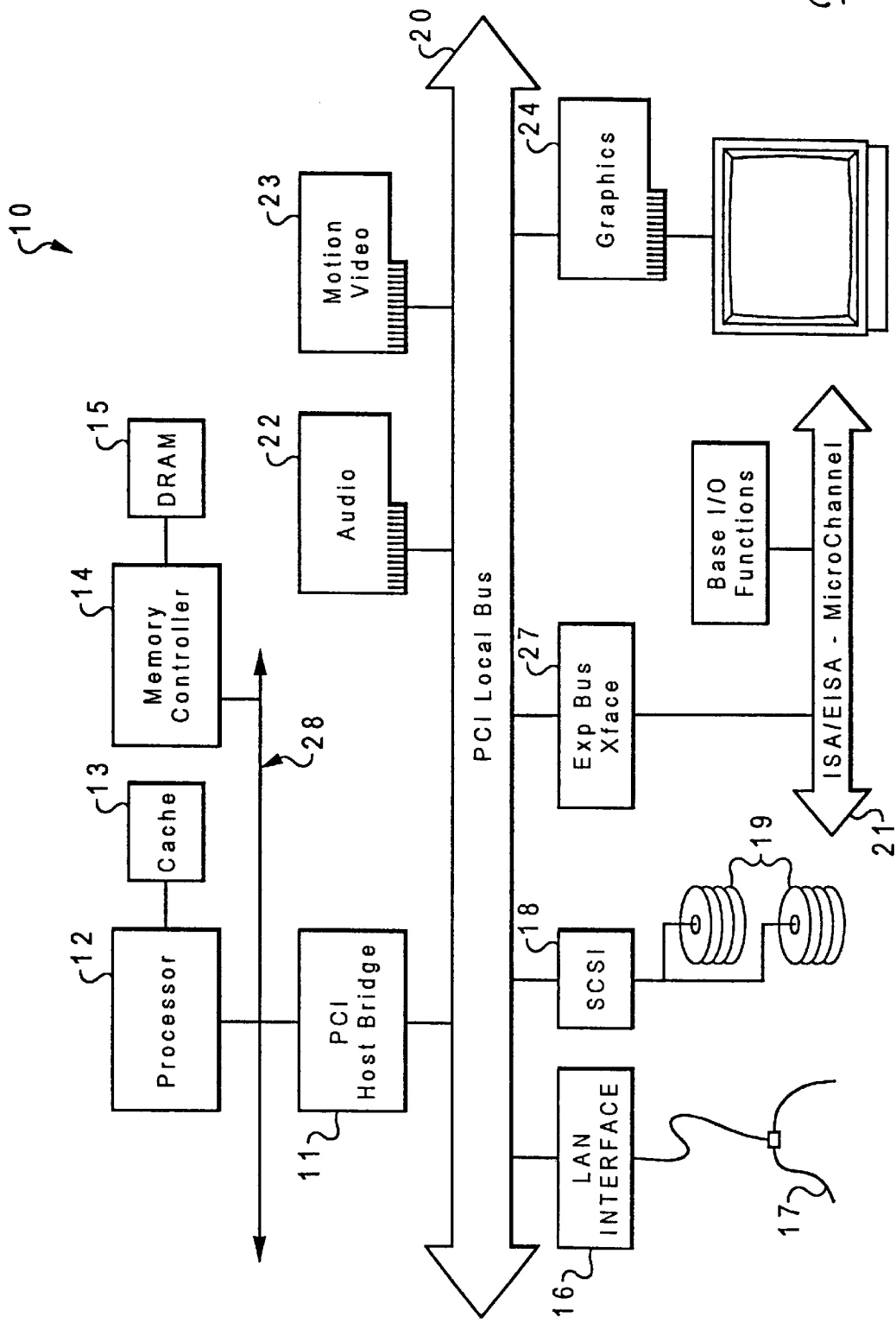
FIG. 1 is a block diagram of a typical computer system having a PCI local bus architecture, which may utilize a preferred embodiment of the present invention.

Referring now to the drawings and in particular to FIG. 1, there is depicted a block diagram of a typical computer system having a PCI local bus architecture, which may utilize a preferred embodiment of the present invention. As shown, a processor 12, a cache memory 13, a memory controller 14, and a Dynamic Random Access Memory (DRAM) 15 are connected to a system bus 28 of a computer system 10. Processor 12, cache memory 13, memory controller 14, and DRAM 15 are also coupled to a PCI local bus 20 of computer system IC through a PCI host bridge 11. PCI host bridge 11 provides a low latency path through which processor 12 may directly access PCI devices mapped anywhere within bus memory and/or I/O address spaces. PCI host bridge 11 also provides a high bandwidth path for allowing a PCI device to directly access DRAM 15. PCI host bridge 11 may include various functions such as data buffering/posting and arbitration.

Also attaching to PCI local bus 20 may be other devices such as a local-area network (LAN) interface 16, a small computer system interface (SCSI) 18, and an expansion bus interface 27. LAN interface 16 is for connecting computer system 10 to a local-area network 17 such as Ethernet or Token-Ring. SCSI interface 18 is utilized to control high-speed SCSI disk drives 19. Expansion bus interface 27 couples any other peripheral buses 21 such as ISA bus, EISA bus, and/or MicroChannel Architecture (MCA) bus to PCI local bus 20. Typically, various peripheral devices for performing certain basic I/O functions are attached to one of peripheral buses 21.

In general, PCI local bus 20 may support up to four add-in board connectors without requiring any expansion capability. Audio adapter board 22, motion video adapter board 23, and graphics adapter board 24 are examples of some devices that may be attached to PCI local bus 20 via add-in board connectors.

Figure 2:
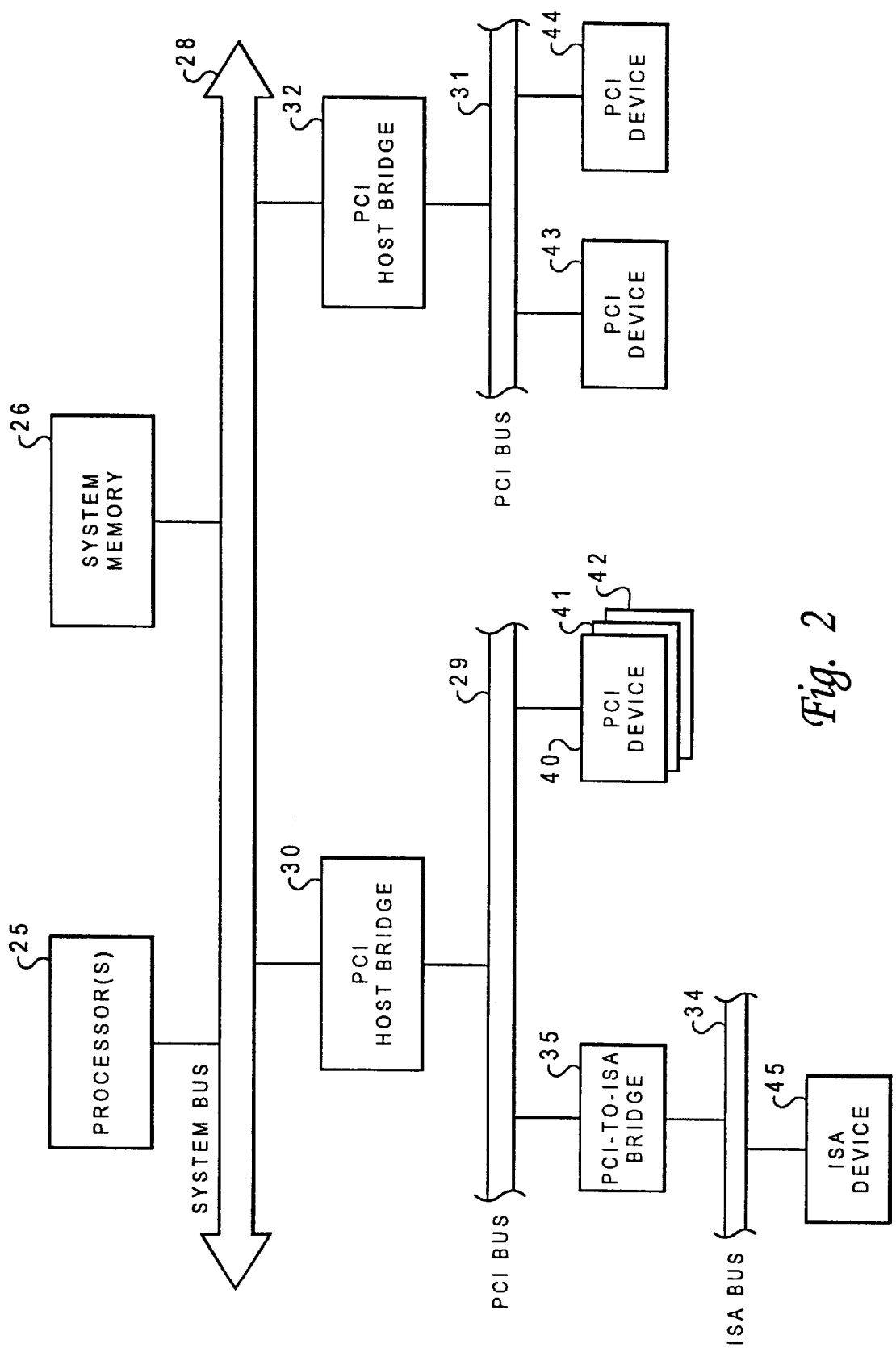
FIG. 2 is a block diagram of a configuration having separate PCI local buses under separate PCI host bridges, in accordance with a preferred embodiment of the present invention.

With reference now to FIG. 2, there is illustrated a configuration having separate PCI local buses under separate PCI host bridges, according to a preferred embodiment of the present invention. As shown, processor(s) 25 and a system memory 26 are coupled for communication over a system bus 28. In a preferred embodiment, system bus 28 provides a 32-bit memory address space and a 16-bit I/O address space. A PCI host bridge 30 enables communications between bus agents coupled to system bus 28 and bus agents coupled to a PCI local bus 29. Further, a PCI-to-ISA bridge 35 enables communications between bus agents coupled to an ISA bus 34 (ISA bus 34 is a peripheral bus) and system memory 26. PCI-to-ISA bridge 35 also enables communications between processor(s) 25 and bus agents coupled to an ISA bus 34.

PCI devices 40–42 are bus agents coupled for communication over PCI local bus 29. In addition, PCI host bridge 30 and PCI-to-ISA bridge 35 are coupled as bus agents for communication over PCI local bus 29. PCI host bridge 30 and PCI-to-ISA bridge 35 have the capability to be initiators and targets for access cycles over PCI local bus 29. In a preferred embodiment, PCI local bus 29 comprises 32-bit memory address and 32-bit l/C address spaces, having addresses and data multiplexed over the same bus.

Bus bridges, such as PCI host bridge 30 and PCI-to-ISA bridge 35, are typically coupled between a primary bus and a secondary bus. A bus bridge enables an access request that initiates on the primary bus to have a destination on the secondary bus, and enables an access request that initiates on the secondary bus to have a destination on the primary bus. For example, after receiving an access request from system bus 28, PCI host bridge 30 will initiate an access request on PCI local bus 29 to communicate with one or more of PCI devices 40–42. Or, after receiving an access request from PCI local bus 29, PCI host bridge will initiate an access request on system bus 28 to communicate with system memory 26. Similarly, after receiving an access request from ISA bus 34, PCI-to-ISA bridge 35 will initiate an access request on PCI local bus 29 to communicate with Pal host bridge 30. Or, after receiving an access request from PCI local bus 29, PCD-to-ISA bridge 35 will initiate an access request on ISA bus 34 to communicate with ISA device 45.

In addition to PCD host bridge 30, a PCI host bridge 32 is also attached to system bus 28. Similar to PCI host bridge 30, PCI host bridge 32 enables communications between bus agents coupled to system bus 28 and bus agents coupled to a PCI local bus 31. Attaching to PCI local bus 31 are PCI devices, such as PCI device 43 and PCI device 44.

For the purpose of illustration, during a peer-to-peer transaction, the source PCI device is referred to as a Transaction Master, the first PCI host bridge encountered is referred to as a Master PCI host bridge, the second PCI host bridge encountered is referred to as a Target PCI host bridge, and the destination PCI device is referred to as a Transaction Target. Note that any peer-to-peer transaction that goes between PCI host bridges must not have an ISA device as the source of the access request. Transactions from a PCI master under any PCI host bridge within the system, on the other hand, can access ISA devices (that is, ISA device is the target of the operation).

Figure 3:
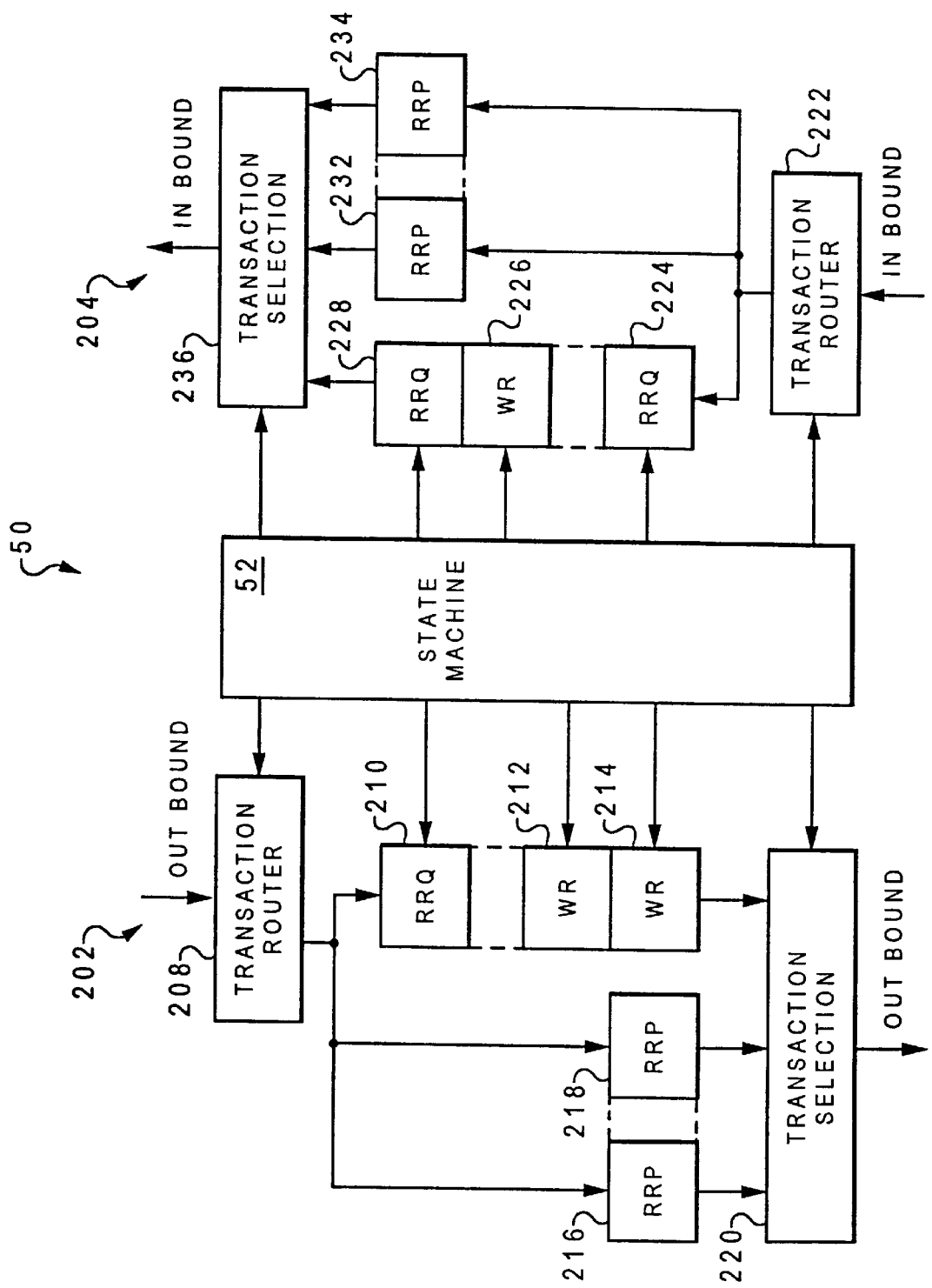
FIG. 3 is a block diagram of a PCI host bridge in accordance with a preferred embodiment of the present invention.

Referring now to FIG. 3, there is illustrated a block diagram of a PCI host bridge in accordance with a preferred embodiment of the present invention. As shown, PCI host bridge 50 has two data paths, namely, an outbound path 202 and an inbound path 234. An outbound transaction refers to a transaction that is away from a processor while an inbound transaction refers to a transaction that is toward a processor. All inbound and outbound transactions are controlled by state machine 52. When an outbound transaction is received by transaction router 208, the transaction format is examined to determine whether the transaction is a read request (request for data), a read reply (a response to a read request that provides data), or a write request (a request to place data in a specific device). A read request has a format that includes an address and control information. A read reply has a format that includes an address, control information, and requested data for the original requester. A write request, such as a posted memory write or I/O write includes an address, control information, and data that will be written into the selected address.

If the transaction currently active in transaction router 208 is a read request, the transaction will be forwarded to one of sequential buffers 213, 212, 214. The number of sequential buffers may be of any appropriate number that is adequate to handle the stack of transactions anticipated to be pending in PCI host bridge 50. If the transaction is a write request, such as an I/O write or posted memory write, the transaction will also be forwarded to one of sequential buffers 210, 212, 214. However, if the transaction pending in transaction router 208 is a read reply, the read reply transaction will be transmitted to one of parallel buffer entries 216, 218. The flow of transactions from the transaction router 208 to sequential buffers 210, 212, 214, and to parallel buffers 216, 218 are controlled by state machine 52. At any time, the transaction to be selected and passed to a secondary bus by transaction selection circuit 220 is controlled by state machine 52.

As shown, inbound path 204 includes the same elements as those in outbound path 202, except the elements are connected in a reverse order. As explained above with reference to outbound transaction router 208, inbound transaction router 222 is controlled by state machine 52. Each transaction is routed to one of the sequential inbound buffers 224, 226, 228 for read requests and write requests. Read reply transactions are transmitted to parallel buffers 232, 234. Inbound transaction selection circuit 236, under the control of state machine 52, controls transmission of transactions from either sequential buffers 224, 226, 228 or from parallel buffers 232 or 234.

Table 1 shows an ordering rule matrix for translating outbound transactions through a PCI host bridge including a PCI peer-to-peer access across multiple PCI host bridges within a computer system, in accordance with a preferred embodiment of the present invention. State machine 52 operates under protocols as defined by Table 1 for translating outbound transactions through a PCI host bridge including a PCI peer-to-peer access across multiple PCI host bridges.

TABLE I

| Subsequent Outbound Transaction | Preceding Outbound Transaction | | | | | |
|---|---|---|---|---|---|---|
| | Peer-to-Peer Write Req | Peer-to-Peer Read Req | Store Request to Pheripheral Memory or I/O Space | Load Request to Peripheral Memory or I/O Space | DMA Read Completion Data from System Memory to PCI Device | Peer-to-Peer Read Completion Data |
| Peer-to-Peer Write Request | N * | Y # | Y # | Y # | Y # | Y # |
| Peer-to-Peer Read Request | N * | Y/N | Y/N | Y/N | Y/N | Y/N |
| Store Request to Peripheral Memory or I/O Spaces | N * | Y/N | N | Y/N | Y/N | Y/N |
| Load Request to Peripheral Memory or I/O Spaces | N * | Y/N | N | Y/N | Y/N | Y/N |
| DMA Read Completion Data from System Memory to PCI Device | Y % | Y % | Y | Y | Y/N | Y/N |

TABLE I-continued

| | Preceding Outbound Transaction | | | | | |
|---|---|---|---|---|---|---|
| Subsequent Outbound Transaction | Peer-to-Peer Write Req | Peer-to-Peer Read Req | Store Request to Pheripheral Memory or I/O Space | Load Request to Peripheral Memory or I/O Space | DMA Read Completion Data from System Memory to PCI Device | Peer-to-Peer Read Completion Data |
| Peer-to-Peer Read Reply Data | Y/N | Y/N | Y/N | Y/N | Y/N | Y/N |

Definitions:

| | |
|---|---|
| Y | indicates a subsequent transaction is not allow to be blocked from making process through a PCI host bridge by a previous transaction |
| N | indicates a subsequent transaction is not allow to complete before a previous transaction |
| Y/N | indicates this is an implementation option for a subsequent transaction to pass a previous transaction |
| * | requirement No. 1 |
| # | requirement No. 2 |
| % | requirement No. 3 |

Including requirements from Table 1, the following are additional requirements for a PCI host bridge that can support peer-to-peer access across multiple PCI host bridges, according to a preferred embodiment of the present invention:

1. A peer-to-peer LOAD or STORE request through a PCI host bridge destined for a PCI bus is not allowed to be passed to a PCI bus before a previous peer-to-peer WRITE request destined for the PCI bus has been passed to the PCI bus. This provides capability to allow software to flush peer-to-peer data out of the PCI host bridge buffers as needed.
2. A peer-to-peer WRITE request destined for a PCI bus must never be blocked from making progress through a PCI host bridge in order to prevent a possible deadlock on the PCI bus. This allows a PCI-to-ISA bus bridge to be supported, within a computer system that also supports peer-to-peer access across multiple PCI host bridges.
3. DMA read completion data from a system memory to a PCI device must never be blocked from completion by anything except other DMA read completion data or peer-to-peer READ completion data. This allows a PCI-to-ISA bus bridge to be supported, within a computer system that also supports peer-to-peer access across multiple PCI host bridges.
4. System hardware that support peer-to-peer operations between the Peripheral Memory Space of a master PCI host bridge and the Peripheral Memory Space of a target PCI host bridge indicate to an operating system that the system hardware supports either peer-to-peer accesses to all other PCI host bridges' Peripheral Memory Space within the platform, or peer-to-peer accesses to only certain PCI host bridges by specifying the ranges of addresses within which the PCI host bridge supports peer-to-peer operations. This allows portability of software across different systems that support partial as well as full peer-to-peer access across multiple PCI host bridges.
5. A target PCI device must not depend on discontiguous Byte Enable signals within one PCI cycle (within one 4-byte access for 32-bit PCI targets or within one 8-byte access for 64-bit targets), on either read or write operations, in order to create a specific side effect. This allows peer-to-peer adapter implementation to be portable across different systems that have different system bus characteristics.
6. A 64-bit PCI transaction target must not depend, on 64-bit accesses during a peer-to-peer operation in order to create a specific side effect (that is, the system hardware may break a 64-bit access at a PCI transaction master into multiple 32-bit accesses or one access with multiple 32-bit cycles, at the PCI transaction target, even when there are contiguous Byte Enable signals across a 4-byte boundary). This allows peer-to-peer adapter implementation to be portable across different systems that have different system bus characteristics.
7. For peer-to-peer READ operations, if a source PCI host bridge is not aware of the prefetchable status of a target PCI device, then the source PCI host bridge must not fetch beyond a 4-byte boundary for a 32-bit PCI master or beyond an 8-byte boundary for a 64-bit master. By permitting prefetching to occur whenever possible, efficient PCI host bridge operation is allowed.
8. A device can never make the acceptance of a peer-to-peer write request contingent on the prior completion of a previous transaction going in the opposite direction. This applies in both the inbound and outbound directions.

As has been described, the present invention provides a method and system for translating PCI peer-to-peer access across separate PCI host bridges within a data-processing system. The present invention describes the case in which the system is providing either full support of PCI peer-to-peer access across all PCI host bridges within the computer system, or across a subset of the PCI host bridges within the computer system such that peer-to-peer transactions can traverse multiple PCI host bridges. Although PCI host bridges are not required by the PCI local bus architecture to handle accesses from one PCI host bridge to another PCI host bridge, it is crucial for the purpose of software transparency.

While the invention has been particularly shown and described with reference to a preferred embodiment, it will be understood by those skilled in the art that various changes in form and detail may be made therein without departing from the spirit and scope of the invention.

What is claimed is:

1. A method for translating peer-to-peer access across separate host bridges within a data-processing system, said method comprising the steps of:

connecting a processor and a system memory to a system bus;

connecting a first local bus to said system bus via a first host bridge;

connecting a second local bus to said system bus via a second host bridge, wherein said two local buses have bus transaction protocols different from those of said system bus;

connecting at least one local bus device to each of said two local buses, wherein said at least one local bus device shares data with said processor and said system memory, wherein each said local bus device shares data with the other said local bus device as peer-to-peer devices across separate host bridges; and controlling a sequence of transactions through said two host bridges to prevent a deadlock condition by not allowing a subsequent peer-to-peer write request destined for one of said two local buses to be blocked from making progress through said two host bridges.

2. The method for translating peer-to-peer access across separate host bridges within a data-processing system according to claim 1, wherein said method further includes a step of preventing a subsequent load or store request destined for a local bus peripheral memory or peripheral I/O spaces from being passed to a local bus before a previous peer-to-peer write request has been passed to said local bus.

3. The method for translating peer-to-peer access across separate host bridges within a data-processing system according to claim 1, wherein said method further includes a step of not blocking a DMA read completion data from said system memory to a local bus device from completion by anything except by a previous DMA read completion data or previous peer-to-peer read completion data.

4. The method for translating peer-to-peer access across separate host bridges within a data-processing system according to claim 1, wherein said method further includes a step of not prefetching by a source host bridge beyond either a 4-byte boundary for a 32-bit local bus master or a 8-byte boundary for a 64-bit local bus master during a peer-to-peer read request, if said source host bridge is not aware of the prefetchable status of a target local bus device.

5. The method for translating peer-to-peer access across separate host bridges within a data-processing system according to claim 1, wherein said method further includes a step of connecting an Industry Standard Architecture (ISA) bus to one of said two local bus via a local-to-ISA bus bridge, wherein at least one ISA device is attached to said ISA bus, wherein transactions are allowed between said at least one ISA device and said processor, said system memory, and transactions are allowed from said at least one local bus device to said at least one ISA device across multiple host bridges.

6. The method for translating peer-to-peer access across separate host bridges within a data-processing system according to claim 1, wherein said method further includes a step of not making the acceptance of a peer-to-peer write request contingent on the prior completion of a previous transaction going in the opposite direction for both inbound and outbound directions.

7. The method for translating peer-to-peer access across separate host bridges within a data-processing system according to claim 1, wherein said host bridges are Peripheral Component Interconnect host bridges, said local buses are Peripheral Component Interconnect local buses, and said local bus devices are Peripheral Component Interconnect devices.

8. The method for translating peer-to-peer access across separate host bridges within a data-processing system according to claim 1, wherein local bus devices are considered as peer-to-peer devices when said local bus devices are coupled to buses at the same level of bus hierarchy.

9. A data-processing system having an architecture for translating peer-to-peer access across separate bridges, comprising:

a system bus connected to a processor and a system memory;

a first local bus and a second local bus, wherein said first and second local buses have bus transaction protocols different from those of said system bus;

at least one local bus device connected to each of said first and second local buses, wherein said at least one local bus device shares data with said processor and said system memory, wherein each said local bus device share data with the other said local bus device as peer-to-peer devices across separate host bridges; and a first host bridge and a second host bridge, wherein said first and second host bridges are utilized to respectively connect said first and second local buses to said system bus, wherein each of said first and second host bridges controls a sequence of transactions to prevent a deadlock condition by not allowing a subsequent peer-to-peer write request destined for one of said first and second local buses to be blocked from making progress through said first and second host bridges.

10. The data-processing system having an architecture for translating peer-to-peer access across separate bridges according to claim 9, wherein each of said at least two host bridges further prevents a subsequent load or store request destined for a local bus peripheral memory or peripheral I/O spaces from being passed to a local bus before a previous peer-to-peer write request has been passed to said local bus.

11. The data-processing system having an architecture for translating peer-to-peer access across separate bridges according to claim 9, wherein each of said at least two host bridges does not block a DMA read completion data from said system memory to a local bus device from completion by anything except by a previous DMA read completion data or previous peer-to-peer read completion data.

12. The data-processing system having an architecture for translating peer-to-peer access across separate bridges according to claim 9, wherein each of said at least two host bridges does not prefetch as a source host bridge beyond either a 4-byte boundary for a 32-bit local bus master or a 8-byte boundary for a 64-bit local bus master during a peer-to-peer read request, if said source host bridge is not aware of the prefetchable status of a target local bus device.

13. The data-processing system having an architecture for translating peer-to-peer access across separate bridges according to claim 9, wherein said data-processing system further includes an Industry Standard Architecture (ISA) bus connected to one of said two local bus via a local-to-ISA bus bridge, wherein at least one ISA device is attached to said ISA bus, wherein transactions are allowed between said at least one ISA device and said processor, and said system memory, and transactions are allowed from said at least one device to said at least one ISA device across multiple host bridges.

14. The data-processing system having an architecture for translating peer-to-peer access across separate bridges according to claim 9, wherein said data processing further includes a means of not making the acceptance of a peer-to-peer write request contingent on the prior completion of a previous transaction going in the opposite direction for both inbound and outbound directions.

15. The data-processing system having an architecture for translating peer-to-peer access across separate bridges according to claim 9, wherein said host bridges are Peripheral Component Interconnect host bridges, said local buses are Peripheral Component Interconnect local buses, and said local bus devices are Peripheral Component Interconnect devices.

16. The data-processing system having an architecture for translating peer-to-peer access across separate bridges according to claim 9, wherein local bus devices are considered as peer-to-peer devices when said local bus devices are coupled to buses at the same level of bus hierarchy.

* * * * *

UNITED STATES PATENT AND TRADEMARK OFFICE
CERTIFICATE OF CORRECTION

PATENT NO. : 5,898,888
DATED : April 27, 1999
INVENTOR(S) : Guthrie et al.

It is certified that error appears in the above-identified patent and that said Letters Patent is hereby corrected as shown below:

Column 5, Line 23 delete "234" and replace with --204--.

Signed and Sealed this

First Day of February, 2000

*Attest:*

Q. TODD DICKINSON

*Attesting Officer*  *Acting Commissioner of Patents and Trademarks*